US007730106B2

(12) United States Patent
Browning

(10) Patent No.: US 7,730,106 B2
(45) Date of Patent: Jun. 1, 2010

(54) COMPRESSION OF ENCRYPTED DATA IN DATABASE MANAGEMENT SYSTEMS

(75) Inventor: James Browning, Columbia, SC (US)

(73) Assignee: Teradata US, Inc., Miamisburg, OH (US)

( * ) Notice: Subject to any disclaimer, the term of this patent is extended or adjusted under 35 U.S.C. 154(b) by 239 days.

(21) Appl. No.: 11/646,987

(22) Filed: Dec. 28, 2006

(65) Prior Publication Data
US 2008/0162521 A1 Jul. 3, 2008

(51) Int. Cl.
*G06F 7/00* (2006.01)

(52) U.S. Cl. .................. 707/802; 707/792; 707/795; 713/161; 713/162; 713/169; 726/2; 726/21; 380/21; 380/44; 380/28

(58) Field of Classification Search ............ 707/1, 707/9, 10, 100, 802, 792, 795; 713/161, 713/162, 169, 187–188; 726/2, 21; 380/21, 380/269, 28, 284, 44, 232
See application file for complete search history.

(56) References Cited

U.S. PATENT DOCUMENTS

| | | | |
|---|---|---|---|
| 5,678,043 A | 10/1997 | Ng et al. | |
| 5,924,094 A * | 7/1999 | Sutter | 707/10 |
| 5,943,421 A | 8/1999 | Grabon | |
| 5,963,642 A * | 10/1999 | Goldstein | 707/9 |
| 6,018,744 A * | 1/2000 | Mamiya et al. | 707/102 |
| 6,122,379 A * | 9/2000 | Barbir | 380/269 |
| 6,154,542 A | 11/2000 | Crandall | |
| 6,446,092 B1 * | 9/2002 | Sutter | 707/203 |
| 6,542,992 B1 | 4/2003 | Peirce, Jr. et al. | |
| 6,591,272 B1 * | 7/2003 | Williams | 707/102 |
| 6,760,345 B1 * | 7/2004 | Rosengard | 370/477 |
| 7,181,017 B1 * | 2/2007 | Nagel et al. | 380/282 |
| 7,237,268 B2 * | 6/2007 | Fields | 713/153 |
| 7,254,837 B2 * | 8/2007 | Fields | 713/153 |
| 2002/0118837 A1 * | 8/2002 | Hamilton | 380/277 |
| 2003/0123671 A1 * | 7/2003 | He et al. | 380/282 |
| 2003/0204718 A1 | 10/2003 | Connelly et al. | |
| 2004/0136566 A1 | 7/2004 | Cho et al. | |
| 2004/0218760 A1 * | 11/2004 | Chaudhuri | 380/217 |
| 2004/0221160 A1 * | 11/2004 | Douceur et al. | 713/176 |
| 2006/0015944 A1 * | 1/2006 | Fields | 726/27 |
| 2006/0053112 A1 * | 3/2006 | Chitkara et al. | 707/9 |
| 2006/0136524 A1 * | 6/2006 | Wohlers et al. | 707/204 |
| 2006/0136528 A1 * | 6/2006 | Martin et al. | 707/205 |
| 2007/0061896 A1 * | 3/2007 | Ferguson | 726/30 |
| 2008/0033960 A1 * | 2/2008 | Banks et al. | 707/9 |
| 2008/0046479 A1 * | 2/2008 | Pareek et al. | 707/202 |
| 2008/0082834 A1 * | 4/2008 | Mattsson | 713/189 |

OTHER PUBLICATIONS

"On Compression of Encrypted Images"—Schonberg et al.—Proceedings of International conference Images—2006 Citeseer (pp. 1-4).*
"On compressing of Encrypted data"—Johnson et al.—Department of Electronical Engineering and Computer Scinwts, IEEE Transactions On—2004, Citeseer (pp. 1-34).*

* cited by examiner

*Primary Examiner*—John E Breene
*Assistant Examiner*—Anh Ly
(74) *Attorney, Agent, or Firm*—Schwegman, Lundberg, Woessner

(57) ABSTRACT

The subject matter herein relates to database management systems and, more particularly, compression of encrypted data in database management systems. Various embodiments provide systems, methods, and software that compress encrypted column values stored tables. Some other embodiments include declaring tables with column encrypt and compress attributes.

15 Claims, 4 Drawing Sheets

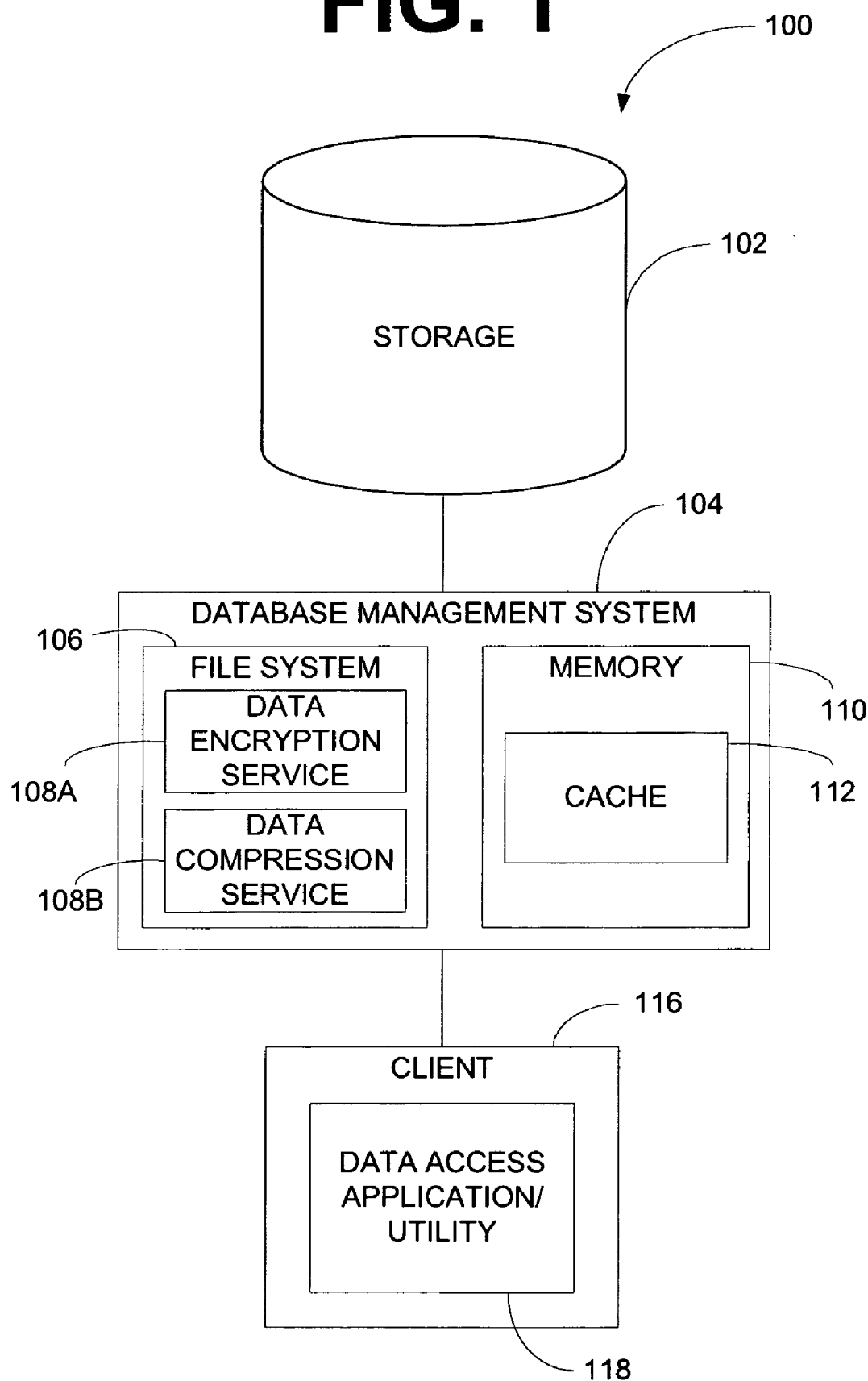

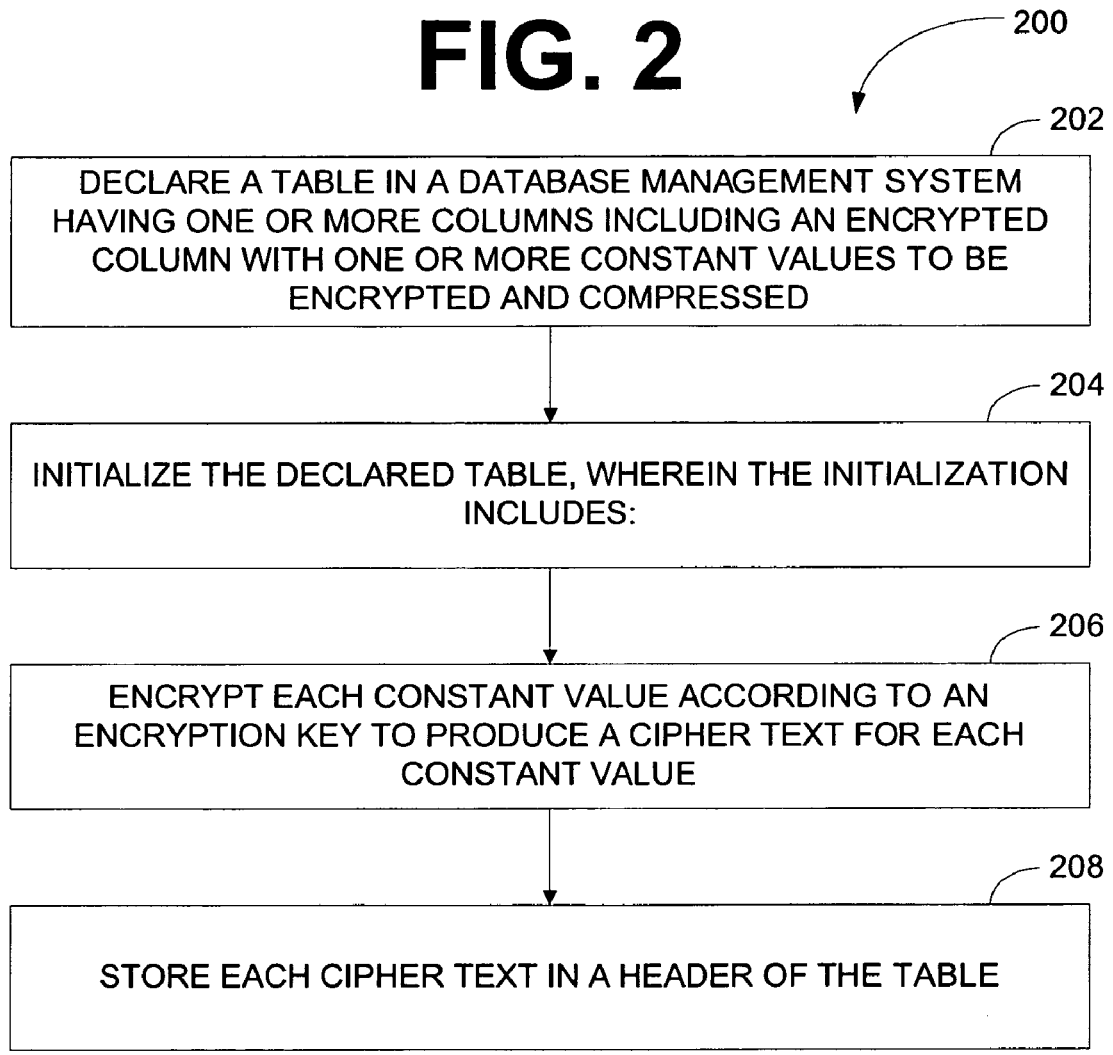

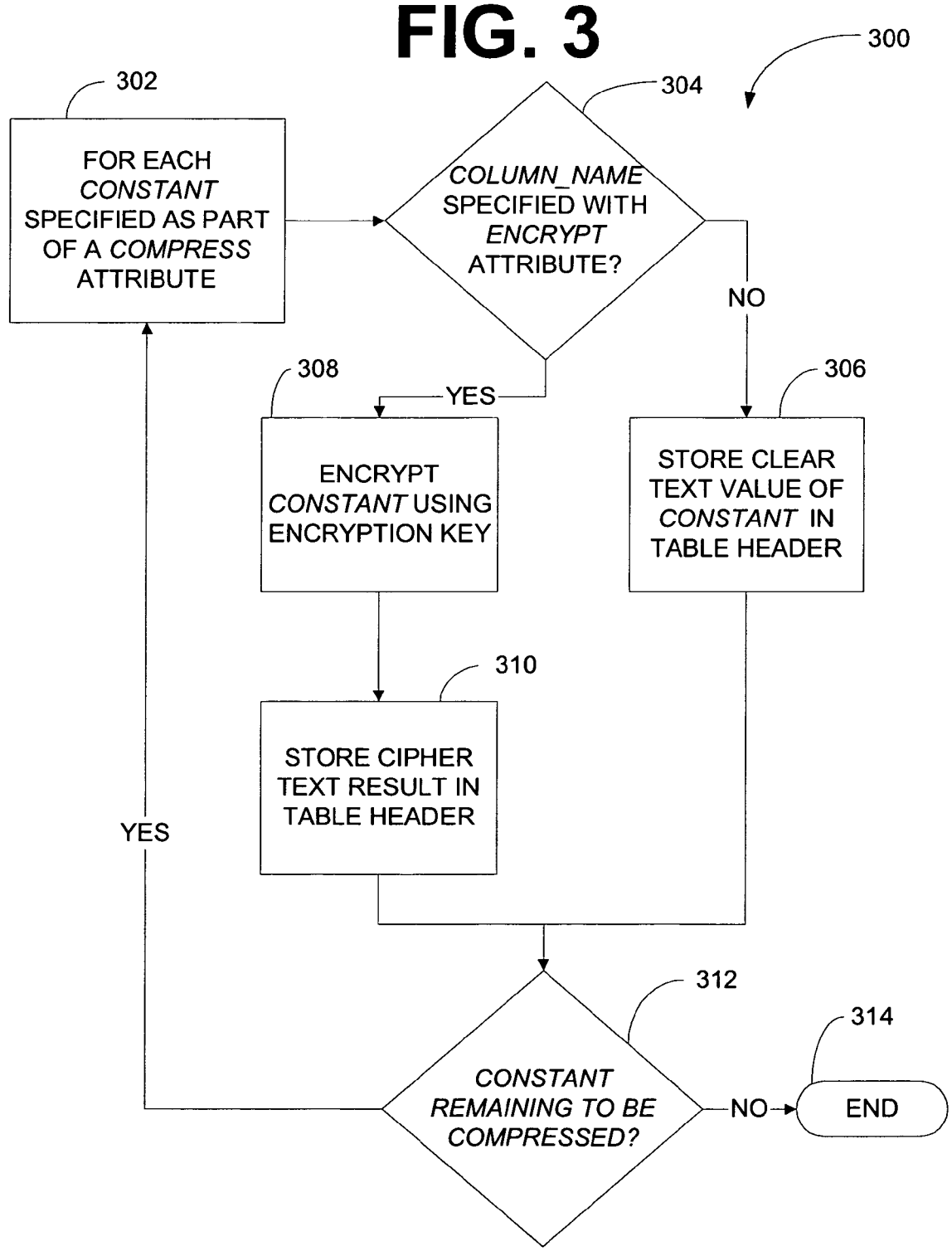

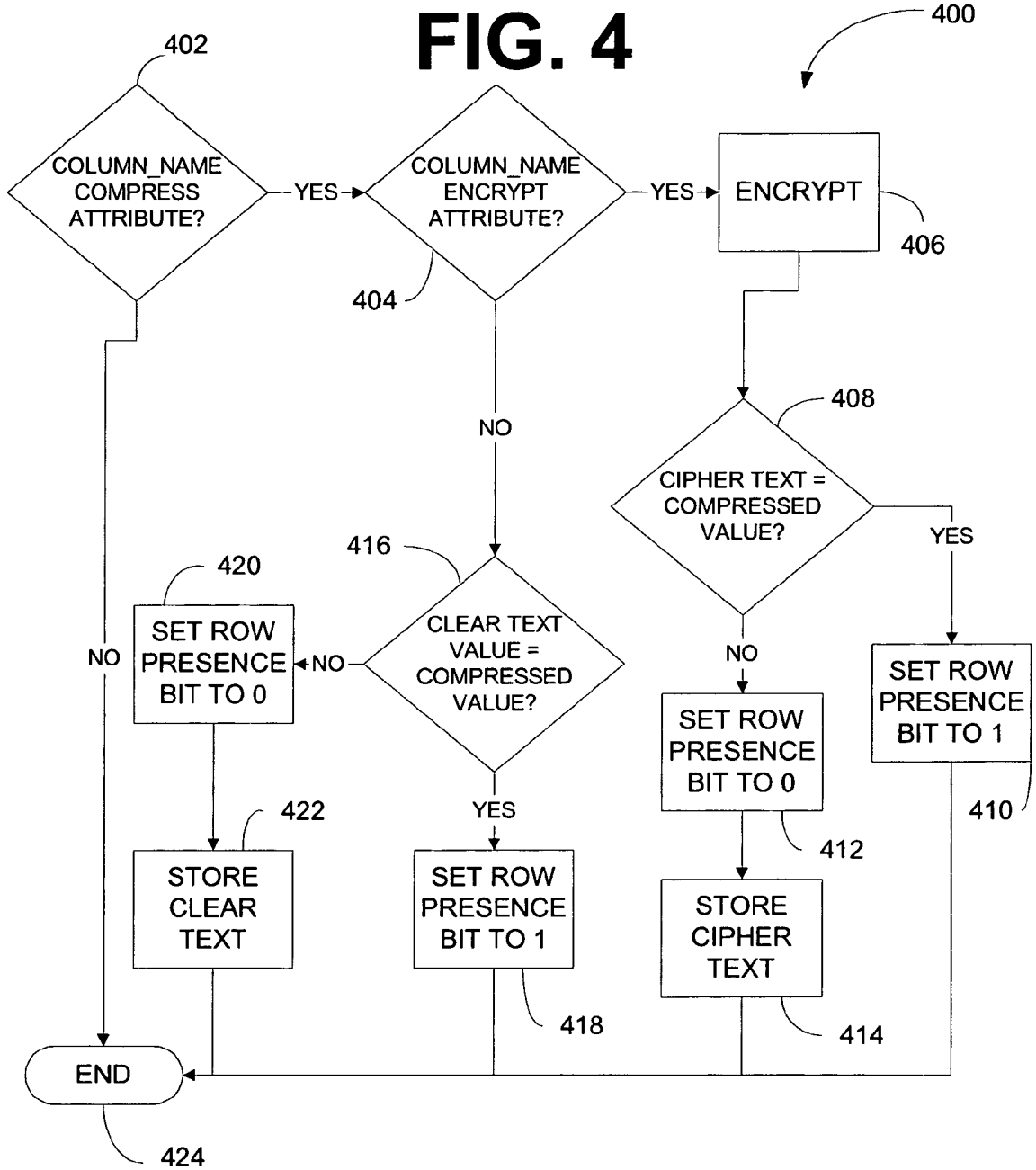

COMPRESSION OF ENCRYPTED DATA IN DATABASE MANAGEMENT SYSTEMS

TECHNICAL FIELD

The inventive subject mater relates to database management systems and, more particularly, compression of encrypted data in database management systems.

BACKGROUND INFORMATION

To prevent the compromise of sensitive information (credit card numbers, social security numbers, etc.), industry standards and security/privacy laws often mandate the use of encryption. Such standards and laws include the Health Insurance Portability and Accountability Act of 1996 (HIPAA), the Database Breach Notification Act (CA SB 1386), the Payment Card Industry Data Security Standard, and others.

Encryption is the process of translating data (clear text) into a form that is not interpretable (cipher text) should the data be compromised. This translation is done using strong cryptographic algorithms in conjunction with secret keys. The correct secret key is required to reverse the translation such that the original data can be interpreted. To ensure the security of the process, the strong cryptographic algorithms employ advanced mathematical techniques that tend to be very processing intensive.

Typical data warehouse applications involve running queries against very large data sets. Consequently, compression is a useful technique for minimizing table storage space. Compression reduces storage costs by storing more logical data per unit of physical capacity producing smaller rows resulting in an increased number rows stored in each data block. This ultimately requires fewer data blocks to store a table. Compression also improves system performance by reducing the amount of disk I/O required to retrieve the rows of a table.

Due to use of block encryption algorithms, initialization vectors, and other cryptographic techniques, the size of a column containing cipher text can be significantly larger than that of its original clear text value. Similarly, since values to be compressed are specified using clear text values, the corresponding cipher text is not compressed. This can result in significant increases in table sizes when encrypting one or more columns.

BRIEF DESCRIPTION OF THE DRAWINGS

FIG. 1 is a block diagram of a system according to an example embodiment.

FIG. 2 is a block flow diagram of a method according to an example embodiment.

FIG. 3 is a block flow diagram of a method according to an example embodiment.

FIG. 4 is a block flow diagram of a method according to an example embodiment.

DETAILED DESCRIPTION

The various embodiments described herein provide systems, methods, and software for compression of cipher text in database table columns. These embodiments help maintain the benefits of reduced storage consumption and cost while increasing system performance when using data compression in conjunction with encryption.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Some database management systems, such as database management and data warehousing systems available from Teradata of Dayton, Ohio, use a non-adaptive, lossless, corruption-resistant compression algorithm called the Dictionary Index method to compress values independently on a column-by-column basis. Lossless means that although the data is compacted, there is no loss of information as there is, for example, with many audio and video compression algorithms.

Some such database management systems use compression algorithms that do not replace values to be compressed with encoded representations of those values. Instead, these database management systems store one copy of a compressed value per column in a table header and nothing at all in any row that contains that value. The mechanism of resolving which compressed values belong to which row is based on presence bits that index particular values stored in the table header.

In some such embodiments, the granularity of the data compression is the individual field of a row, which is generally the finest level possible. Field compression optimizes concurrency as well as offering superior performance for query and update processing when compared to row-level or block-level compression schemes. Row-level and block-level compression methods generally require additional system resources to uncompress the row or block whenever it might contribute to a result set, whether it eventually does contribute to the result or not. Furthermore, field compression allows compression to be optimized for the data type of each column.

When a set of column values is designated for compression, the system adds space to a field of the appropriate table header to store the compressed value set. This compression is generally internal to the system and is therefore generally transparent to Extract, Transform, Load ("ETL") operations, queries using base table access, queries using view access, and application software.

FIG. 1 is a block diagram of a system 100 according to an example embodiment. The example system 100 includes a storage device 102, a database management system 104, and a client computing device 116.

The storage device 102, in some embodiments, is a hard disk resident on a computing device and can be accessed by the database management system 104. In some embodiments, the database management system 104 and the storage device are located on the same computing device, such as a server computer. In other embodiments, the storage device 102 includes one or more computing devices such as a storage server, a storage area network, or another suitable device.

The client 116, in some embodiments, is a client computer and includes a data access application or utility 118. The client 116 is communicatively coupled to the database management system 104 and may submit queries to and receive query results from the database management system 104.

The database management system 104, in typical embodiments, is a relational database management system. The database management system includes a file system 106 and a memory 110.

The memory 110 is a memory that is resident on a computing device on which the database management system 104 operates. The memory 110 is illustrated within the database management system 104 merely as a logical representation.

The memory 110 includes a cache 112 that holds transient data under control of the file system 106. Data written to the database management system 104 is first written to the cache 112 and eventually is flushed from the cache 112 after the file system 106 writes the data to the storage device 102. Also, data retrieved from the storage device 102 in response to a query, or other operation, is retrieved by the file system 106 to the cache 112.

The database management system 104 includes a file system. In some embodiments, the system 106 provides service calls that allow the database management system 104 to store and retrieve data independent of an underlying operating system. The file system 106 typically manages data blocks that contain one or more rows of a single table. In some embodiments, physical input and output performed by the file system 106 is performed at the granularity of one or more data blocks. Data blocks are physically stored on disk in sectors which are logically grouped together as cylinders. The first portion of a cylinder contains the cylinder index which describes the location and length of each data block on the cylinder. Information about the table with which a data block is associated is also included in the cylinder index. In some such embodiment, the file system 106 maintains the cache 112 in the memory 110. The cache 112 holds data blocks that have been loaded from disk or written by users. All data in the cache is unencrypted clear text. Requests, or queries, for rows within a table are satisfied from data blocks maintained within the cache 112. Thus, when a query is made against the database, the file system 106 identifies the relevant tables, reads those tables into the cache 112, and performs the query against the table or tables in the cache 112.

In some embodiments, data stored in one or more columns of an individual table in the database may be both encrypted and compressed at the column level. In some such embodiments, the data of a column is encrypted and compressed by the data encryption service 108A and data compression service 108B of the file system when the data is stored. The data encryption service 108A is used when data stored in a column must be encrypted or decrypted as required by the execution of a Structured Query Language ("SQL") request. The compression service 108B is also used when data stored in a column must be compressed or uncompressed as required by the execution of a SQL request. FIG. 2, FIG. 3, and FIG. 4 illustrate example methods performed by the data encryption 108A and compression services 108B.

FIG. 2 is a block flow diagram of a method 200 according to an example embodiment. The example method 200 includes declaring a table in a database management system having one or more columns including an encrypted column with one or more constant values to be encrypted and compressed 202. The method 200 further includes initializing the declared table 204. In some embodiment, initializing the declared table 204 includes encrypting each constant value according to an encryption key to produce a cipher text for each constant value 206 and storing each cipher text in a header of the table 208.

In some embodiments of the method 200, the encryption key is associated with the table when the table is declared. In other embodiments, the encryption key is declared globally within the database management system. The encryption key, in some embodiments, is a 128-bit Advanced Encryption Standard key. In other embodiments, the key is another type of encryption key suitable for symmetric encryption. Larger bit and smaller bit encryption keys may also be used depending on the security requirements of the particular embodiment.

When declaring a table in a database management system 202, an example of a syntax to use in declaring the table is as follows:

```
CREATE TABLE table_name . . .
   . . .
   column_name data_type ENCRYPT key_identifier
      COMPRESS (constant, constant, . . .) . . .
   . . .
   ;
```

Where:
   table_name is the name of the table to create;
   column_name is the name of a column in the table;
   key_identifier is a reference to a key accessible within the database management system; and
   constant is a clear text expression of a data value to be compressed.

The method 200, in some embodiments, further includes selecting one or more rows of data from the initialized 204 table. The selecting typically includes processing each column of data to be selected in the row by determining if the column is to be uncompressed and decrypted. If the column is to be uncompressed and decrypted, the method 200, in such embodiments, includes retrieving a cipher text value from the table header and decrypting the value to produce the clear text representation. The clear text representation is then used to service the query.

FIG. 3 is a block flow diagram of a method 300 according to an example embodiment. The method 300 is an example method of initializing a declared table, such as a table declared in the example syntax above. First however, an example syntax of the method 300 is as follows:

```
...
For each constant specified as part of a COMPRESS attribute
    If column_name is specified with an ENCRYPT
    attribute, then
        Encrypt constant using the specified
        key_identifier
        Store cipher text result in table header
    Else
        Store clear text value of constant in table header
    Endif
...
```

The method 300 includes evaluating each column constant declared with a compress attribute 302 and determining 304 if the column of the constant is specified with an encrypt attribute. If not, the method 300 includes storing the clear text value of the constant in the table header 306 and determining if a constant remains to be compressed 312.

If the determination 304 is that the column of the constant is specified with an encrypt attribute, the method 300 includes encrypting the constant using a specified encryption key 308, storing the cipher text result in the table header 310, and determining if a constant remains to be compressed 312.

If the determination if a constant remains to be compressed 312 is that there is a constant remaining, the method returns to evaluate each column declared with a compress attribute 302. If the determination 312 is that there is not a constant remaining, the method 300 ends.

As an added result of the method 300 beyond the data compression saving and security of the column encryption, additional security benefit is provided in that no clear text values of potentially sensitive information will be stored in the table header.

FIG. 4 is a block flow diagram of a method 400 according to an example embodiment. The method 400 is an example method performed when a row is inserted in an initialized table. The method 400 includes determining for each column, when writing a row, if the column is to be compressed 402. If the column is not to be compressed, the value is written to the column and the method 400 ends 424.

If the column is to be compressed, a determination is made if the column is also to be encrypted 404. If the column is not to be encrypted, clear text value is compared against the values to compress in the table header for the column 416. If a match is made, the row presence bit is set to one "1" 410 and the method 400 ends 424. If the clear text value does not match a value to compress, the row presence bit is set to zero "0," the clear text is written to the column 422, and the method 400 ends 424.

If the determination 404 is that the column is also to be encrypted, the clear text value of the column is encrypted 406 into a cipher text. The cipher text is then compared against cipher text values stored in the header of the table to compress 408. If a match is made, the row present bit is set to one "1" 410 and the method 400 ends 424. If a match is not made, the row presence bit is set to zero "0" 412, the cipher text is stored 414, and the method 400 ends.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, arrangements of the parts and method stages which have been described and illustrated in order to explain the nature of this invention may be made without departing from the principles and scope of the invention as expressed in the subjoined claims.

What is claimed is:

1. A method implemented in a computer-readable storage medium and to execute on a processor for performing the method, comprising:
   declaring, by the processor, a table in a database management system having one or more columns including an encrypted column with one or more constant values that are to be both encrypted and compressed, some columns are encrypted when an encryption attribute is present, some columns are compressed when a compression attribute is present, and some columns are both encrypted and compressed when both the encryption and compression attribute are present;
   initializing, by the processor, the declared table, the initialization includes:
      encrypting, by the processor, each constant value according to an encryption key to produce a cipher text for each constant value when the encryption attribute is present
      compressing, by the processor, each cipher text when the compression attribute is present; and
      storing, by the processor, each encrypted, compressed, and encrypted and compressed cipher text in a header of the table; and
   selecting, by the processor, one or more rows of data from the initialized table; selecting a row includes:
   for each column of data to be selected in the row, determining if the column is to be uncompressed and decrypted; and
   if the column is to be uncompressed and decrypted, retrieving a cipher text value from the table header and decrypting the value to produce the clear text representation.

2. The method of claim 1, wherein the encryption key is associated with the table when the table is declared.

3. The method of claim 1, wherein the encryption key is declared globally within the database management system.

4. The method of claim 1, wherein the encryption key is a 128-bit Advanced Encryption Standard key.

5. The method of claim 1, wherein the database management system is a relational database management system.

6. A system implemented in a computer-readable storage medium and to execute on one or more processors, comprising:
   a database management system, which is a relational database management system and implemented in a computer-readable medium and to execute on a processor and including a file system, memory, column data encryption and compression services that:
   service column declaration of table declaration statements including a declaration of a column, the column including an encryption attribute, a compression attribute, or both the encryption and compression attribute indicating that the column is to be both encrypted and compressed, encryption is based on an encryption key; and service column initialization of a declared table where the column is declared to be both encrypted and compressed when both the encryption and compression attributes are present, when the column includes just the compression attribute just compression of the column takes place, and when the column includes just the encryption attribute just encryption of the column takes place, encryption results in a cipher text for each constant that is encrypted and compression results in the cipher text being compressed, both encryption and compression results in the cipher text being both encrypted and compressed, and each compressed cipher text is stored for each constant appearing in data for the column in a header of the table; and selecting, by the processor, one or more rows of data from the initialized table;

selecting a row includes:

for each column of data to be selected in the row, determining if the column is to be uncompressed and decrypted; and if the column is to be uncompressed and decrypted, retrieving a cipher text value from the table header and decrypting the value to produce the clear text representation.

7. The system of claim 6, wherein the encryption key is associated with the table when the table is declared.

8. The system of claim 6, wherein the encryption key is declared globally within the database management system.

9. The system of claim 6, wherein the encryption key is a 128-bit Advanced Encryption Standard key.

10. The system of claim 6, wherein the database management system is a relational database management system.

11. A computer-readable storage medium, with instructions that execute on a processor and cause the processor to:

declare a table in a database management system having one or more columns, some columns compressed, some columns encrypted, and some columns both encrypted and compressed, constant values in the columns are subject to compression, encryption, or both encryption and compression based on attributes associated with the columns; and initialize the declared table, the initialization includes:

encrypting each constant value for columns having an encryption attribute according to an encryption key to produce a cipher text for each constant value;

compressing each cipher text for each constant value for columns having a compression attribute; and storing each encrypted, compressed, or encrypted and compressed cipher text in a header of the table; and select one or more rows of data from the initialized table, wherein selecting a row includes:

for each column of data to be selected in the row, determining if the column is to be uncompressed and decrypted; and if the column is to be uncompressed and decrypted, retrieving a cipher text value from the table header and decrypting the value to produce the clear text representation. header of the table.

12. The machine-readable medium of claim 11, wherein the encryption key is associated with the table when the table is declared.

13. The machine-readable medium of claim 11, wherein the encryption key is declared globally within the database management system.

14. The machine-readable medium of claim 11, wherein the encryption key is a 128-bit Advanced Encryption Standard key.

15. The machine-readable medium of claim 11, wherein the database management system is a relational database management system.

* * * * *